(12) United States Patent
Wellborn et al.

(10) Patent No.: US 8,627,908 B2
(45) Date of Patent: Jan. 14, 2014

(54) SEMI-AUTONOMOUS VEHICLE PROVIDING AN AUXILIARY POWER SUPPLY

(75) Inventors: Carl W. Wellborn, Detroit, MI (US); Mary Ellen Decaluwe, Oxford, MI (US); Jim K. Rainbolt, Haslett, MI (US); Roger A. Clark, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 533 days.

(21) Appl. No.: 13/016,969

(22) Filed: Jan. 29, 2011

(65) Prior Publication Data

US 2012/0193153 A1 Aug. 2, 2012

(51) Int. Cl.
*B62D 53/04* (2006.01)

(52) U.S. Cl.
USPC .................................. 180/14.2; 701/96

(58) Field of Classification Search
USPC ............ 180/14.1, 14.2, 14.6, 2.1, 11; 701/90, 701/96, 70
See application file for complete search history.

(56) References Cited

U.S. PATENT DOCUMENTS

| | | | |
|---|---|---|---|
| 5,810,105 A | 9/1998 | Trainer | |
| 5,921,708 A | 7/1999 | Grundl et al. | |
| 6,301,530 B1 | 10/2001 | Tamura | |
| 6,313,758 B1 | 11/2001 | Kobayashi | |
| 6,640,164 B1 | 10/2003 | Farwell et al. | |
| 7,277,784 B2 | 10/2007 | Weiss | |
| 7,593,811 B2 | 9/2009 | Schmidt et al. | |
| 2005/0162106 A1 | 7/2005 | Cho et al. | |
| 2007/0233337 A1 | 10/2007 | Plishner | |
| 2008/0059007 A1 | 3/2008 | Whittaker et al. | |
| 2010/0044998 A1 | 2/2010 | Franchineau | |
| 2010/0065344 A1* | 3/2010 | Collings, III | 180/2.1 |
| 2012/0168234 A1* | 7/2012 | Hellholm et al. | 180/14.2 |
| 2012/0193154 A1* | 8/2012 | Wellborn et al. | 180/14.2 |
| 2012/0245796 A1* | 9/2012 | Yu et al. | 701/41 |
| 2013/0006451 A1* | 1/2013 | Cooper et al. | 701/19 |

FOREIGN PATENT DOCUMENTS

| | | |
|---|---|---|
| JP | 2010015194 | 1/2010 |
| WO | WO0223296 | 3/2002 |

OTHER PUBLICATIONS

U.S. Appl. No. 13/016,975, filed Jan. 29, 2011, Wellborn, et al.

* cited by examiner

*Primary Examiner* — Tashiana Adams

(57) ABSTRACT

A semi-autonomous vehicle couplable to a parent vehicle is described, and includes a chassis supported on first and second axles coupled to a plurality of wheels, a propulsion system configured to transfer torque to one of the wheels, a steering system configured to control direction of travel of the semi-autonomous vehicle, a braking system configured to apply braking force to the wheels, a high-voltage electrical energy storage system, an extra-vehicle communications system, and an extra-vehicle sensory system. A control system operatively couples to the propulsion system, the steering system, and the braking system. A coupling device is configured to electrically couple the semi-autonomous vehicle to the parent vehicle, the coupling device consisting essentially of a high-voltage DC electrical power bus electrically coupled to the high-voltage electrical energy storage system.

20 Claims, 3 Drawing Sheets

SEMI-AUTONOMOUS VEHICLE PROVIDING AN AUXILIARY POWER SUPPLY

TECHNICAL FIELD

This disclosure is related to electrical-powered vehicles, and auxiliary power supplies associated therewith.

BACKGROUND

The statements in this section merely provide background information related to the present disclosure and may not constitute prior art.

Known electric vehicle systems use batteries that have power densities that are substantially less than that of gasoline or diesel fuel used in internal combustion engines. Known battery systems take a substantial amount of time to recharge. These factors affect travel range of electric vehicles.

Range-extending trailers that are mechanically coupled to a host or parent vehicle and include an internal combustion engine coupled to an electric generator are known. Range-extending trailers that include batteries and fuel cells that are mechanically coupled to parent vehicles are known.

SUMMARY

A semi-autonomous vehicle couplable to a parent vehicle includes a chassis supported on first and second axles coupled to a plurality of wheels, a propulsion system configured to transfer torque to one of the wheels, a steering system configured to control direction of travel of the semi-autonomous vehicle, a braking system configured to apply braking force to the wheels, a high-voltage electrical energy storage system, an extra-vehicle communications system, and an extra-vehicle sensory system. A control system operatively couples to the propulsion system, the steering system, and the braking system. A coupling device is configured to electrically couple the semi-autonomous vehicle to the parent vehicle, the coupling device consisting essentially of a high-voltage DC electrical power bus electrically coupled to the high-voltage electrical energy storage system. An electric power management system is configured to control flow of electric power originating from the high-voltage electric power storage system to the high-voltage DC electrical power bus of the coupling device.

BRIEF DESCRIPTION OF THE DRAWINGS

One or more embodiments will now be described, by way of example, with reference to the accompanying drawings, in which.

DETAILED DESCRIPTION

Figures 1, 2:
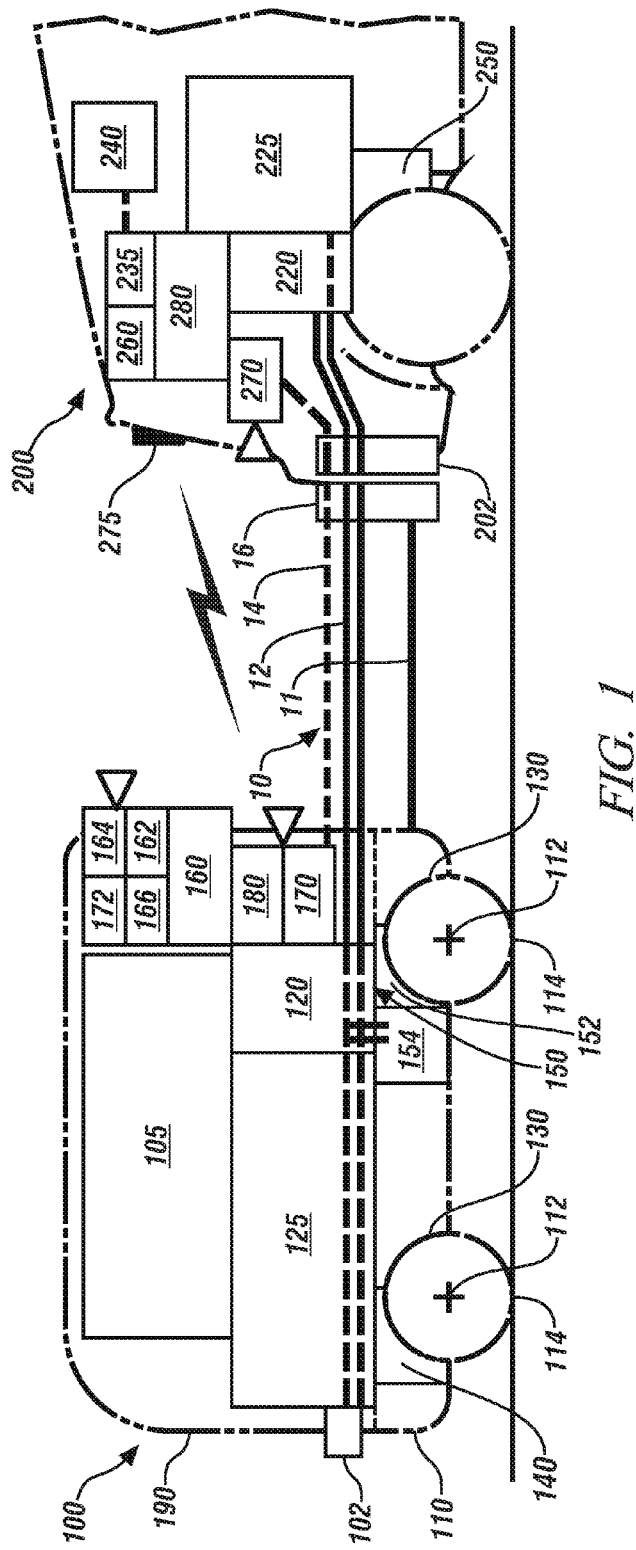
FIGS. 1, 2, 3, and 4 are schematic illustrations of semi-autonomous wheeled vehicles and a portion of a parent vehicle in accordance with the present disclosure.

Referring now to the drawings, wherein the showings are for the purpose of illustrating certain exemplary embodiments only and not for the purpose of limiting the same, FIG. 1 schematically illustrates a semi-autonomous wheeled vehicle 100 couplable to an electrically powered parent vehicle 200. The semi-autonomous wheeled vehicle 100 includes an electrical coupler 10 that includes a connector 16 that is configured to connect to the electrically powered parent vehicle 200 at a connector 202. As configured, there is no mechanical load between the semi-autonomous wheeled vehicle 100 and the electrically powered parent vehicle 200 during operation. In one embodiment the electrical coupler 10 includes only a high-voltage DC electric power bus 12 for transferring electric power between the semi-autonomous wheeled vehicle 100 and the parent vehicle 200. In one embodiment the electrical coupler 10 includes the high-voltage electric power bus 12 for transferring electric power between the semi-autonomous wheeled vehicle 100 and the parent vehicle 200 and a high-speed communications link 14 for communicating between the semi-autonomous wheeled vehicle 100 and the parent vehicle 200. In one embodiment the electrical coupler 10 may include a back-up mechanical link element 11 that connects between the chassis of the parent vehicle 200 and the chassis of the semi-autonomous wheeled vehicle 100. The back-up mechanical link element 11 is a high tensile strength cable that functions as a safety chain to prevent uncontrolled dissociation of the semi-autonomous wheeled vehicle 100 from the parent vehicle 200 in event of a fault. In one embodiment, the back-up mechanical link element 11 includes a flexible mechanical shroud element encasing the high-voltage electric power bus 12 that is configured to become a rigid connection when extended to a predetermined length. The back-up mechanical link element 11 may also function to prevent uncontrolled collision between the semi-autonomous wheeled vehicle 100 and the parent vehicle 200.

The high-voltage DC electrical power bus 12 electrically couples to a high-voltage electrical energy power management system 220 of the parent vehicle 200 via the connector 202. The high-voltage electrical energy power management system 220 of the parent vehicle 200 may include a high-voltage electric power bus. The high-voltage electrical energy power management system 220 may direct transferred electric power from the semi-autonomous wheeled vehicle 100 to a vehicle propulsion system 250. The high-voltage electrical energy power management system 220 may direct transferred electric power from the semi-autonomous wheeled vehicle 100 to an on-vehicle high-voltage electrical energy storage system 225.

The parent vehicle 200 is a fully functional autonomous vehicle that includes a propulsion system 250 that uses power originating from electric energy to generate tractive torque, and may include any electric vehicle having an on-board electric energy storage and propulsion system that converts high-voltage electric power to tractive torque, including using multiphase electric machines to generate torque. The parent vehicle 200 includes a control system 280, a sensing system 260, and a communications system 270. The parent vehicle 200 includes a target device 275 that is preferably mounted on the back of the vehicle. The target device 275 may be a signal reflective device, or a radio-frequency transponder, or another suitable device that is discernible by a remote sensor, and is mounted in a manner that permits it to be detected by a remote sensor mounted on the semi-autonomous wheeled vehicle 100. The parent vehicle 200 also includes a human/machine interface (HMI) system 235, which communicates with on-vehicle HMI devices including a steering wheel, an accelerator pedal, a brake pedal, a cruise control system, and a lane-change indicator on systems so equipped. In one embodiment, the cruise control system is controlled by an adaptive cruise control system 240. Adaptive cruise control systems are known and described in detail herein.

The HMI system 235 monitors operator inputs to the various on-vehicle HMI devices and communicates such information, e.g., accelerator pedal position, brake pedal position, a cruise control input, and lane-change indicator position to a control system 180 of the semi-autonomous wheeled vehicle 100. Other information of the parent vehicle 200 that is communicated to the semi-autonomous wheeled vehicle 100 preferably includes vehicle motion states of vehicle speed, acceleration, lateral speed and acceleration, yaw-rate, steering angle, and direction of travel, which are detectable by devices and algorithms that are elements the sensing system 260.

The semi-autonomous vehicle 100 is preferably a steerable, self-propelled, multi-axled, multi-wheeled vehicle providing conveyance for a high-voltage electric power storage system 125. The semi-autonomous wheeled vehicle 100 is equipped with systems providing autonomously controllable steering, ground acceleration, and braking functions. The semi-autonomous wheeled vehicle 100 includes a lockable, sealable stowage and conveyance system 105 in one embodiment. The semi-autonomous wheeled vehicle 100 electrically couples to and is configured to operate in a close-order platoon with the parent vehicle 100 to provide electrical energy to the parent vehicle 200 that originates in the high-voltage electric power storage system 125 contained on-board.

The semi-autonomous vehicle 100 includes a chassis 110, an electric power management system 120 including the high-voltage electric power storage system 125, a braking system 130, a steering system 140, a propulsion system 150, a sensory system 160, a communications system 170, and the control system 180.

The chassis 110 includes a framework that is supported on axles 112 on which wheels 114 employing low rolling resistance tires are rotatably mounted.

The propulsion system 150 is configured to transfer tractive torque to the wheels 114. The propulsion system 150 includes one or a plurality of multiphase electric motors 152 rotatably attached to the wheels 114 mounted on the axles 112. Each multiphase electric motor 152 is preferably configured to function as a torque motor and as an electric power generator. Each multiphase electric motor 152 electrically connects to a power inverter system 154 to convert high-voltage DC electric power to AC power for operating the multiphase electric motor 152 and to convert AC power generated by the multiphase electric motor 152 to high-voltage DC electric power that may be stored in the high-voltage electric power storage system 125.

In one embodiment, the propulsion system 150 includes a single multiphase electric motor 152 that is rotatably attached to one of the wheels 114. In one embodiment, the propulsion system 150 includes a plurality of multiphase electric motors 152 that are rotatably attached to corresponding wheels 114. In one embodiment, the propulsion system 150 includes first and second multiphase electric wheel motors 152 that are attached to the wheels 114 mounted on opposite ends of one of the axles 112. In this embodiment, the remaining wheels 114 are mounted on the second of the axles 112 in a caster arrangement.

The braking system 130 is configured to apply braking force to the wheels 114 in response to a braking command. The braking system 130 preferably includes a system to activate the electric wheel motor(s) 152 that is attached to the wheels 114 to apply electric power to the electric wheel motor(s) 152 in a manner that causes vehicle braking and coincidently generates electric power, referred to as regenerative braking. The braking system 130 may include an electrically-activated mechanical braking system that includes a disc brake system that is activated by a controllable solenoid device. The braking system 130 preferably has anti-lock braking capability and traction control.

The steering system 140 is configured to provide lateral motion control and thus control direction of travel of the semi-autonomous vehicle 100. In one embodiment, the steering system 140 includes an electrically-actuated rack-and-pinion steering system coupled to one or a plurality of the wheels 114 to control the orientation of the one of the wheels 114 and thus control the direction of travel. In one version of the embodiment with the steering system 140 including the electrically-actuated rack-and-pinion steering system, the electrically-actuated rack-and-pinion steering system is coupled to one of the wheels 114 in a forward position on the semi-autonomous vehicle 100. In one version of the embodiment with the steering system 140 including the electrically-actuated rack-and-pinion steering system, the electrically-actuated rack-and-pinion steering system is coupled to one of the wheels 114 in a rearward position on the semi-autonomous vehicle 100. In one embodiment, the steering system 140 includes a control system that independently controls rotational speeds of the electric wheel motors 152 that are mounted on opposite ends of one of the axles 112. Direction of travel of the semi-autonomous vehicle 100 is controlled by controlling rotational speeds of the electric wheel motors 152, including differentially controlling the rotational speeds of the electric wheel motors 152 to effect turning.

The electric power management system 120 manages electric power flow between the high-voltage electric power storage system 125, the power inverter system 154, an AC power connection 102 and the electrical coupler 10.

The electric power management system 120 electrically connects to the high-voltage electric power storage system 125. The high-voltage electric power storage system 125 includes a plurality of high-voltage rechargeable battery elements, e.g., lithium-ion-based battery elements.

The electric power management system 120 electrically connects to the AC power connection 102 and to the electrical coupler 10.

The electric power management system 120 controls flow of electric power originating from a stationary power source through the AC power connection 102 to charge the high-voltage electric power storage system 125.

The electric power management system 120 controls flow of electric power originating from the high-voltage electric power storage system 125 to the electrical coupler 10 to the high-voltage electrical energy power management system 220 of the parent vehicle 200, preferably in response to a request for electric power originating from the parent vehicle 200.

The electric power management system 120 operatively connects to the power inverter system 154 to convert high-voltage DC electric power to AC power for operating the multiphase electric motor(s) 152 and to convert AC power generated by the multiphase electric motor(s) 152 to high-voltage DC electric power that may be stored in the high-voltage electric power storage system 125.

The electric power management system 120 includes monitoring algorithms to monitor parameters associated with the high-voltage electric power storage system 125, including, e.g., a state-of-charge. Such information is communicated to the control system 180.

The sensory system 160 preferably includes an extra-vehicle spatial monitoring system 162 and a chassis monitoring system 166. A primary function of the sensory system 160 is to enable to the semi-autonomous vehicle 100 to follow the parent vehicle 200 in a controlled manner.

The spatial monitoring system 162 includes a control module that connects to a front sensor 164 to capture and analyze signals associated with remote objects proximate to the semi-autonomous wheeled vehicle 100. The front sensor 164 is preferably configured to detect and quantify a location of the parent vehicle 200. The front sensor 164 is positioned within the semi-autonomous wheeled vehicle 100 in a relatively unobstructed position to permit forward-monitoring, preferably in a position that facilitates detecting and identifying the target device 275 mounted on the parent vehicle 200. The spatial monitoring system 162 preferably determines a linear range, relative speed, and trajectory of the parent vehicle 200 based upon signals from the front sensor 164 associated with detecting and identifying the target device 275. In one embodiment the front sensor 164 quantifies a range and a lateral position of the parent vehicle 200 relative to the semi-autonomous wheeled vehicle 100. Data from the front sensor 164 is periodically collected and analyzed. The spatial monitoring system 162 communicates the range and lateral position of the parent vehicle 200 to the control system 180. The control system 180 generates commands for the braking system 130, steering system 140, and propulsion system 150 to facilitate tracking and following of the parent vehicle 200 by the semi-autonomous wheeled vehicle 100.

There may be a single one or a plurality of front sensors 164 positioned within the semi-autonomous wheeled vehicle 100 in relatively unobstructed positions. In one embodiment the front sensor 164 includes short-range radar devices to assist in monitoring the region in front of the semi-autonomous wheeled vehicle 100, i.e., the parent vehicle 200. The front sensor 164 may also assist in monitoring oncoming traffic beside and behind the semi-autonomous wheeled vehicle 100. The front sensor 164 may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The front sensor 164 may include a radio-frequency interrogation device. The possible object-locating devices may include charged-coupled devices (CCD) or complementary metal oxide semi-conductor (CMOS) video image sensors, and other known camera/video image processors which utilize digital photographic methods to view forward objects including the target device 275 of the parent vehicle 200. Such sensing systems are employed for detecting and locating objects in automotive applications and are useable with systems including adaptive cruise control system, collision avoidance, pre-crash safety, and side-object detection. Such sensing devices may be configured to provide rear obstacle detection functionality.

The spatial monitoring system 162 may include other sensors for detecting and quantifying locations of proximate remote objects, including stationary and moving objects. Placement of the sensors permits the spatial monitoring system 162 to monitor the parent vehicle 200 and to traffic flow including proximate object vehicles and other objects around the semi-autonomous wheeled vehicle 100 and the parent vehicle 200.

The chassis monitoring system 166 includes devices for monitoring vehicle operation to determine motion states of the semi-autonomous wheeled vehicle 100. The vehicle motion states preferably include, e.g., vehicle speed, steering angle of the steerable wheels, and yaw rate. The chassis monitoring system 166 includes inertial sensors, e.g., rate gyros and accelerometers. The chassis monitoring system 166 estimates the vehicle motion states, such as yaw-rate and lateral speed, and estimates lateral offset and heading angle of the semi-autonomous wheeled vehicle 100. The measured yaw rate is combined with steering angle measurements to estimate lateral speed. The chassis monitoring system 166 generates signals associated with vehicle motion states that may be monitored by other vehicle control systems for vehicle control and operation, and may be communicated to the parent vehicle 200. One exemplary vehicle control system may include an autonomous lane change system. A global position sensing (GPS) system 172 including a GPS locator may also be included. The GPS locator generates and broadcasts a signal indicating a present location of the semi-autonomous wheeled vehicle 100, and may be used for tracking and as a theft deterrent.

The extra-vehicle communications system 170 provides communications between the semi-autonomous wheeled vehicle 100 and the parent vehicle 200. In one embodiment, the extra-vehicle communications system 170 includes the high-speed communications link 14 for communicating between the semi-autonomous wheeled vehicle 100 and the parent vehicle 200 that is an element of the electrical coupler 10. Alternatively or in addition, the communication system 170 may include a wireless communications system to communicate with the corresponding communications system 270 of the parent vehicle 200. Wireless communications may include any suitable communications protocol, including, e.g., one based upon IEEE 802.11. The semi-autonomous wheeled vehicle 100 may be configured to communicate with other vehicles, systems, and controllers under specific circumstances when the communication system 170 includes a wireless communications system.

The control system 180 operatively connects to the propulsion system 150, the steering system 140, the braking system 130, and the sensory system 160. The control system 180 receives information from the HMI system 235 of the parent vehicle 200 via the communications system 170, including information originating from the adaptive cruise control system 240. The control system 180 includes executable control schemes for controlling operation of the semi-autonomous wheeled vehicle 100, including when coupled to the parent vehicle 200. The control schemes preferably entail electric power transfer to the parent vehicle 200 and operation of the semi-autonomous wheeled vehicle 100. Operation of the semi-autonomous wheeled vehicle 100 includes operation when electrically coupled to the parent vehicle 200, including when operating on public and private highways in a close-order platooning configuration. Operation of the semi-autonomous wheeled vehicle 100 includes operation when decoupled from the parent vehicle 200.

Operation of the semi-autonomous wheeled vehicle 100 when electrically coupled to the parent vehicle 200 includes monitoring information from the HMI system 235 and the adaptive cruise control system 240 of the parent vehicle 200 via the communications system 170. This includes monitoring operator inputs to the HMI system 235 to ascertain operator commands for operating the parent vehicle 200 through the steering wheel, the accelerator pedal, the brake pedal, the cruise control system, and the lane-change indicator. Monitoring operation of the parent vehicle 200 includes monitoring information from the sensing system 260 of the parent vehicle 200 including vehicle motion states of vehicle speed, acceleration, lateral speed and acceleration, yaw-rate, steering angle, and direction of travel. Monitoring operation of the parent vehicle 200 further includes monitoring inputs from the spatial monitoring system 162 to determine a linear range, relative speed, and trajectory of the parent vehicle 200.

The control system 180 integrates and analyzes all of the aforementioned information from the parent vehicle 200 and the semi-autonomous wheeled vehicle 100, and determines control states for each of the braking system 130, steering system 140, and the propulsion system 150 to control speed, acceleration, and direction of travel of the semi-autonomous wheeled vehicle 100 such that it remains at a following distance of 1.5 m+/−0.4 m behind the parent vehicle 200 and in the same lane as the parent vehicle 200.

Another control scheme includes a safety chain control system to effect a controlled operation of the semi-autonomous wheeled vehicle 100 under a condition when the electrical coupler 10 that connects to the electrically powered parent vehicle 200 is disconnected, damaged, or otherwise compromised. The safety chain control system includes capability to interrupt and discontinue electric power flow through the electrical coupler 10. In one embodiment, the safety chain control system includes capability to control operation of the semi-autonomous wheeled vehicle 100 to effect a controlled stopping maneuver of the semi-autonomous wheeled vehicle 100 independently of the parent vehicle 200.

In one embodiment, the semi-autonomous wheeled vehicle 100 is an electrically-propelled vehicle with an overall weight of 680 kg (1500 lbs.) and a payload (i.e., batteries and stowage) capacity of at least 460 kg (1000 lbs.). The tires 114 are low-rolling resistance tires. The semi-autonomous wheeled vehicle 100 preferably has a removable body element 190. The external design of the body element 190 preferably complements the design of the parent vehicle 200, with an aerodynamic profile that minimizes drag of the combination of the parent vehicle 200 in conjunction with the semi-autonomous wheeled vehicle 100. In one embodiment, the body element 190 may be replaced, thus allowing an operator to select a body element 190 for the semi-autonomous wheeled vehicle 100 that conforms to the selected parent vehicle 200. FIG. 2 is a schematic side-view of an exemplary parent vehicle 200 coupled to an exemplary semi-autonomous vehicle 100 via an exemplary electrical coupler 10. As depicted, the body element 190 for the semi-autonomous wheeled vehicle 100 is designed to conform to body contours of the parent vehicle 200 to minimize drag. An exemplary target device 275 is also depicted on the parent vehicle 200.

In one embodiment, the controller 180 is programmable, thus allowing an operator or a skilled technician to program the controller 180 such that the control system for the semi-autonomous wheeled vehicle 100 conforms to the selected parent vehicle 200, taking into account features of the parent vehicle 200 and communications protocols associated therewith. One feature of the parent vehicle 200 that may be provided by the semi-autonomous wheeled vehicle 100 may be rear obstacle detection.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 3:
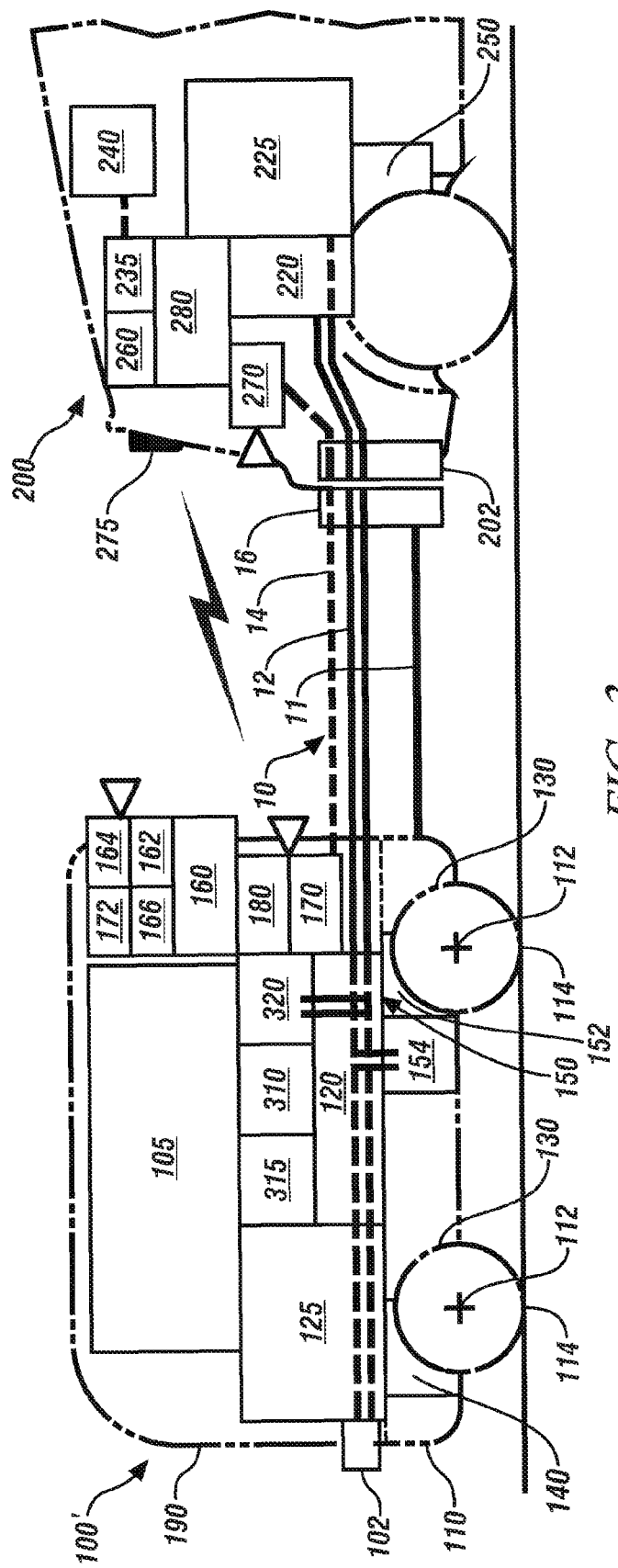

FIG. 3 schematically illustrates an embodiment of the semi-autonomous wheeled vehicle 100'. The semi-autonomous vehicle 100' includes an electric power generation system including an internal combustion engine 310 operatively coupled to an electric generator 320 that generates electric power that is transferred to the high-voltage electric power storage system 125 of the semi-autonomous wheeled vehicle 100' and/or to the on-vehicle high-voltage electrical energy storage system 225 of the parent vehicle 200. The semi-autonomous vehicle 100' includes a liquid fuel storage system 315 configured to store and transfer liquid fuel to the internal combustion engine 310 during operation. In this embodiment, it is appreciated that the charge capacity and associated quantity of cells contained in the high-voltage electric power storage system 125 may be reduced, with any associated vehicle weight advantage offset by the internal combustion engine 310 and the electric generator 320. All other functions remain as described with reference to FIG. 1. It is appreciated that the internal combustion engine 310 may be any suitable configuration of appropriate size and power output to achieve a requisite electric power output. It is appreciated that the internal combustion engine 310 may operate on gasoline, diesel fuel, LPG, natural gas, ethanol, or another suitable fuel.

Figure 4:
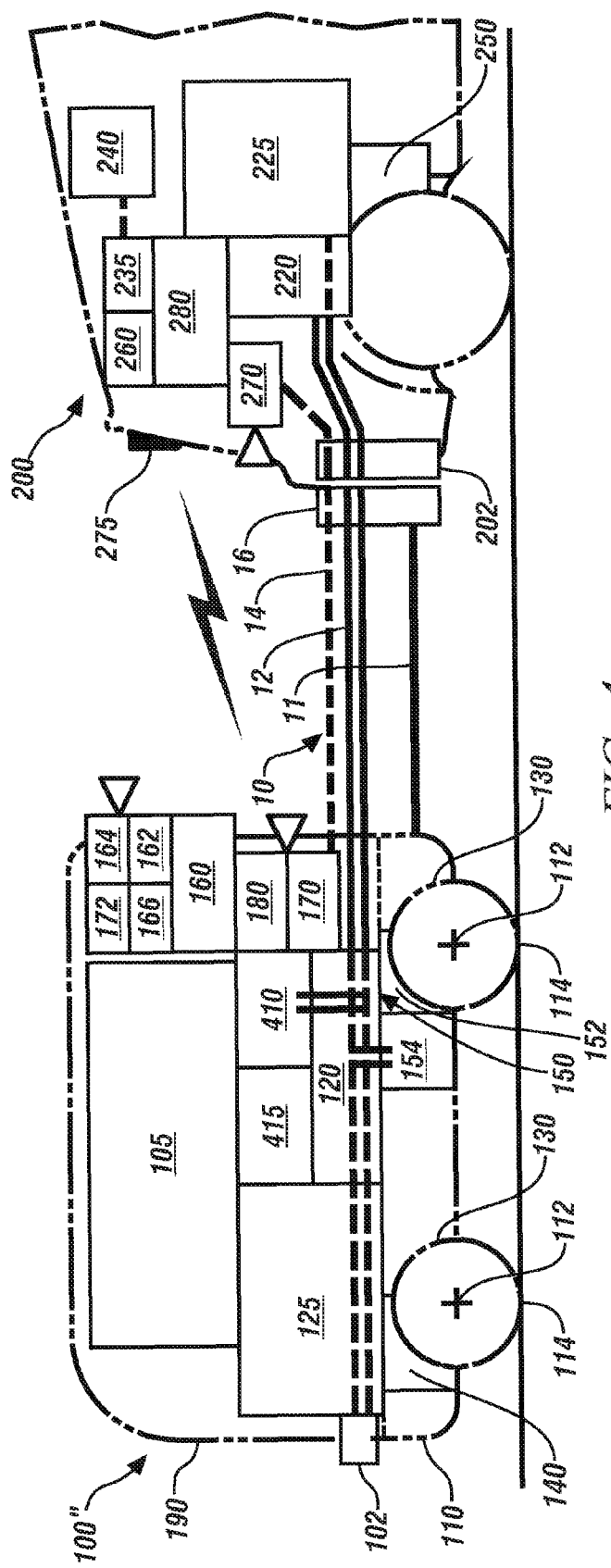

FIG. 4 schematically illustrates an embodiment of the semi-autonomous vehicle 100". The semi-autonomous vehicle 100" includes an electric power generation system including a fuel cell 410 that generates electric power that is transferred to the high-voltage electric power storage system 125 of the semi-autonomous wheeled vehicle 100" and/or to the on-vehicle high-voltage electrical energy storage system 225 of the parent vehicle 200. The semi-autonomous vehicle 100" includes a liquid fuel storage system 415 configured to store and transfer liquid fuel to the fuel cell 410 during operation. In this embodiment, it is appreciated that the charge capacity and associated quantity of cells contained in the high-voltage electric power storage system 125 may be reduced, with any associated vehicle weight advantage offset by the fuel cell 410 and corresponding effect on cargo space in the stowage and conveyance system 105. All other functions remain as described. It is appreciated that the fuel cell 410 may be any suitable fuel cell configuration of appropriate size and power output to achieve a requisite electric power output, including, e.g., a polymer exchange membrane fuel cell and a solid-oxide fuel cell. It is appreciated that the fuel cell 410 may operate on hydrocarbon fuel, hydrogen, or another suitable fuel.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A semi-autonomous vehicle couplable to a parent vehicle, including:
   a chassis supported on first and second axles coupled to a plurality of wheels;
   a propulsion system configured to transfer torque to one of the wheels;
   a steering system configured to control direction of travel of the semi-autonomous vehicle;
   a braking system configured to apply braking force to the wheels;
   a high-voltage electrical energy storage system;
   an extra-vehicle communications system;

an extra-vehicle sensory system;
a control system operatively coupled to the propulsion system, the steering system, and the braking system;
a coupling device, the coupling device consisting essentially of a high-voltage DC electrical power bus electrically coupled to the high-voltage electrical energy storage system, the coupling device configured to electrically couple the high-voltage electrical energy storage system to the parent vehicle; and
an electric power management system configured to control flow of electric power originating from the high-voltage electric power storage system to the high-voltage DC electrical power bus of the coupling device.

2. The semi-autonomous vehicle of claim 1, wherein the propulsion system configured to transfer torque to one of the wheels includes an electrically-powered wheel motor coupled to one of the wheels.

3. The semi-autonomous vehicle of claim 1, wherein the steering system configured to control direction of travel of the semi-autonomous vehicle comprises independently controllable first and second electric wheel motors coupled to first and second ones of the wheels.

4. The semi-autonomous vehicle of claim 1, wherein the steering system configured to control direction of travel of the semi-autonomous vehicle includes an electrically-actuated rack-and-pinion steering system coupled to one of the wheels.

5. The semi-autonomous vehicle of claim 1, wherein the braking system configured to apply braking force to the wheels includes an electric wheel motor coupled to one of the wheels and a power inverter system configured to operate in a regenerative braking mode.

6. The semi-autonomous vehicle of claim 1, wherein the extra-vehicle communications system comprises a wireless communications system operative to communicate with a communication system of the parent vehicle.

7. The semi-autonomous vehicle of claim 1, wherein the extra-vehicle sensory system includes a front sensor configured to detect a target device mounted on the parent vehicle.

8. The semi-autonomous vehicle of claim 7, wherein the extra-vehicle sensory system is configured to determine a linear range, a relative speed, and a trajectory of the parent vehicle correlated to the detected target device mounted on the parent vehicle.

9. The semi-autonomous vehicle of claim 7, wherein the front sensor configured to detect the target device mounted on the parent vehicle comprises one of a radar system, a lidar system, and a digital image capture and processing system.

10. The semi-autonomous vehicle of claim 1, wherein the coupling device is configured to electrically couple the high-voltage electrical energy storage system to a high-voltage electrical energy power management system of the parent vehicle.

11. The semi-autonomous vehicle of claim 10, wherein the electric power management system is configured to control flow of electric power originating from the high-voltage electric power storage system to the high-voltage electrical energy power management system of the parent vehicle via the high-voltage DC electrical power bus of the coupling device.

12. The semi-autonomous vehicle of claim 1, further comprising a sealable storage and conveyance system.

13. A semi-autonomous vehicle couplable to a parent vehicle, including:
a chassis supported on axles coupled to a plurality of wheels;
a propulsion system configured to transfer torque to one of the wheels;
a steering system configured to control direction of travel of the semi-autonomous vehicle;
a braking system configured to apply braking force to the wheels;
an energy storage system;
an extra-vehicle communications system;
an extra-vehicle sensory system;
a control system connected to the propulsion system, the steering system, the braking system, the extra-vehicle communications system and the extra-vehicle sensory system; and
a coupling device, the coupling device consisting essentially of a high-voltage DC electrical power bus electrically coupled to the high-voltage electrical energy storage system, the coupling device configured to electrically couple the high-voltage electrical energy storage system to the parent vehicle; and
an electric power management system configured to control flow of electric power originating from the high-voltage electric power storage system to the high-voltage DC electrical power bus of the coupling device.

14. The semi-autonomous vehicle of claim 13, wherein the energy storage system comprises a liquid fuel storage system and the liquid fuel storage system is configured to transfer liquid fuel to an internal combustion engine operatively coupled to an electric generator.

15. The semi-autonomous vehicle of claim 14, wherein the electric generator is electrically coupled to the high-voltage electrical energy storage system.

16. The semi-autonomous vehicle of claim 13, wherein the energy storage system comprises a liquid fuel storage system and the liquid fuel storage system is configured to transfer the liquid fuel to a fuel cell electrically coupled to the high-voltage electrical energy storage system.

17. The semi-autonomous vehicle of claim 13, wherein the control system is operative to control transfer of electric power between the high-voltage electrical energy storage system of the semi-autonomous vehicle and the energy storage system of the parent vehicle via the coupling device consisting essentially of the high-voltage DC electrical power bus.

18. A semi-autonomous vehicle, including:
a chassis supported on axles coupled to a plurality of wheels;
a propulsion system, a steering system, and a braking system;
an energy storage system;
an extra-vehicle communications system;
an extra-vehicle sensory system;
a control system connected to the propulsion system, the steering system, the braking system, the extra-vehicle communications system and the extra-vehicle sensory system; and
a coupling device for coupling to a parent vehicle, the coupling device comprising a high-voltage DC electrical power bus electrically coupled to the high-voltage electrical energy storage system, the coupling device configured to electrically couple the high-voltage electrical energy storage system to the parent vehicle, and a mechanical link element; and
an electric power management system configured to control flow of electric power originating from the high-voltage electric power storage system to the high-voltage DC electrical power bus of the coupling device.

19. The semi-autonomous vehicle of claim 18, wherein the mechanical link element comprises a high tensile strength cable.

20. The semi-autonomous vehicle of claim 18, wherein the mechanical link element comprises a flexible mechanical shroud element encasing the high-voltage DC electrical power bus, the flexible mechanical shroud element configured to become a rigid connection when extended to a predetermined length.

* * * * *